(No Model.)
I. N. & J. O. KENDALL.
REMOVABLE SAW TOOTH.
No. 488,336. Patented Dec. 20, 1892.
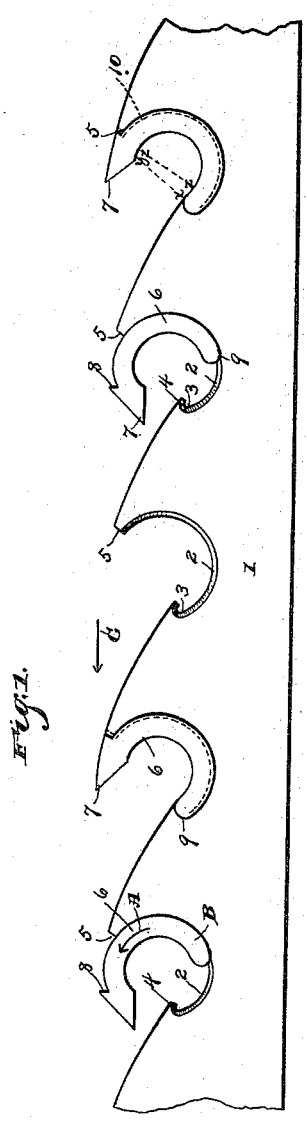
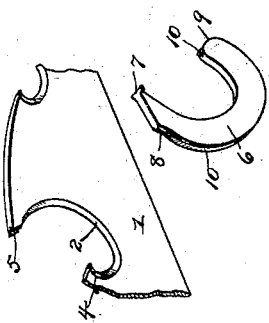
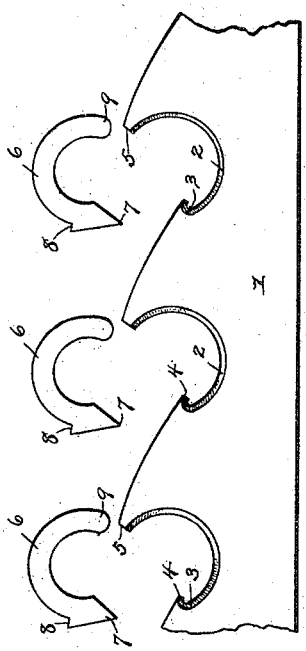
Witnesses
Inventors
Isaac N. Kendall and
J. O. Kendall
By their Attorneys,
C. A. Snow & Co.

UNITED STATES PATENT OFFICE.

ISAAC NEWTON KENDALL AND JAMES OREN KENDALL, OF VANCOUVER, CANADA.

REMOVABLE SAW-TOOTH.

SPECIFICATION forming part of Letters Patent No. 488,336, dated December 20, 1892.

Application filed May 21, 1892. Serial No. 433,889. (No model.)

*To all whom it may concern:*

Be it known that we, ISAAC NEWTON KENDALL and JAMES OREN KENDALL, subjects of the Queen of Great Britain, residing at Vancouver, in the Province of British Columbia, Canada, have invented a new and useful Improvement in Removable Saw-Teeth, of which the following is a specification.

This invention relates to saw teeth, and has special reference to removable saw teeth, and consists of the construction and arrangement of the parts thereof as will be more fully hereinafter described and claimed.

The object of this invention is to provide a removable saw tooth applicable for use with a band saw, and avoid all surface projection in either direction, and rely solely on a spring securing action of the teeth individually within a limited or confining space and at the same time resist a removal of the same by a dragging action exerted thereon, and also materially reduce the cost of production and sale.

In the drawings:—Figure 1 is a plan view of a portion of a band saw, showing the improved teeth in connection therewith, some of the teeth being shown in position of being withdrawn or applied. Fig. 2 is a similar view showing the teeth removed. Fig. 3 is an enlarged perspective view of a portion of a band saw and one of the teeth.

Similar numerals of reference are used to indicate corresponding parts in the several figures.

Referring to the drawings, the numeral 1 designates the saw plate of a band saw, having a series of sockets or seats 2 which is beveled toward a central edge 3 and provided at their lowest extremities with a curved overhanging shoulder 4, and at the upper termination of each socket or seat, the blade 1 is cut to form an abutting end 5. The sockets or seats 2 are circular in form throughout their length except where the overhanging shoulders 4 are formed, at which point a circle of a considerably reduced radius is formed and merges into the remaining larger circular portion of each socket or seat.

The teeth 6 are constructed with points 7 having shoulders 8 in rear of the same which are adapted to abut against the ends 5 of the sockets or seats 2 as set forth, and also formed with rounded ends 9 conforming in curvature to the overhanging shoulders 4 hereinbefore set forth. The back portion of each tooth, from the shoulder 8 thereof to the rounded end 9 of the same, and continuing throughout the curvature of said rounded end, is formed with a groove 10 to fit over the aforesaid central edge 3 of each socket or seat 2, to avoid lateral movement of the tooth, which is essentially necessary in a band saw owing to the thinness of the latter, and were it not so grooved the tooth would be liable to spring to one side or the other of the plate.

When the teeth are inserted in the sockets or seats as set forth, the shoulders 8 of the teeth abut against the abutting ends 5 of the saw plate, and the rounded ends 9 are snugly held under the overhanging shoulders 4. It will be observed that each tooth forms a little less than a true circle when in place in the saw plate, and when out of the plate it is a little larger than a true circle, so that in inserting the tooth into the plate it has to be compressed to form a true circle, the compression virtually making a spring of the tooth and giving a tendency to spread at the points $x$—$y$. As the tooth is more than a half circle, it will be seen that the distance $x$—$y$ is less than the distance $z$—$z$, and it follows that in order to remove a tooth from the blade or plate, it must be turned in the direction of the arrow A Fig. 1, until it is nearly or quite in the position shown at B same figure. But as the saw is always running in the direction of the arrow C, it will be seen that the pressure on the teeth in cutting their way through the wood tends to force them back into sockets or seats, and the spring action across $x$—$y$ holds them firmly in place.

A further advantage of the form of tooth herein set forth resides in the strain or spring of the tooth in fastening being nearly at right angles to the cutting edge of the saw, thereby avoiding expansion of the saw lengthwise. A still further advantage is the formation of the throat or gullet of the herein described tooth nearly as wide as it is deep to thereby provide for a free discharge or passage of the saw-dust which is so essentially necessary in a band saw.

Other advantages will appear from time to time to those skilled in the art to which this invention appertains, and need not be further enlarged upon herein.

Having thus described the invention what is claimed as new is:—

A saw plate or blade having a seat or socket therein continuously curved and formed upon arcs of gradually decreasing circles and terminating in an abruptly-curved socket to form an overhanging shoulder that is continuous of the line of the socket and unbroken at any point, the upper portion of said seat or socket being formed with a straight abutting end, and a tooth correspondingly curved and adapted to fit said seat and also provided with an upper shoulder at its front end and a lower rounded end to engage respectively the abutting end of the seat or socket and be embraced by the lower overhanging shoulder of the blade or plate, said lower end being forced upward under said overhanging shoulder by reason of the contour of the seat and tooth and thereby locked in position in connection with the blade, substantially as described.

In testimony that we claim the foregoing as our own we have hereto affixed our signatures in the presence of two witnesses.

ISAAC NEWTON KENDALL.
JAMES OREN KENDALL.

Witnesses:
T. H. LACLAND,
FREDK. W. ALEXANDER.